United States Patent
Waffenschmidt et al.

(10) Patent No.: US 9,520,225 B2
(45) Date of Patent: Dec. 13, 2016

(54) APPARATUS, A SYSTEM AND A METHOD FOR ENABLING ELECTROMAGNETIC ENERGY TRANSFER

(75) Inventors: Eberhard Waffenschmidt, Aachen (DE); Thomas Falck, Aachen (DE); Dietrich Rogler, Horb (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1378 days.

(21) Appl. No.: 12/441,399

(22) PCT Filed: Sep. 11, 2007

(86) PCT No.: PCT/IB2007/053653
§ 371 (c)(1),
(2), (4) Date: Mar. 16, 2009

(87) PCT Pub. No.: WO2008/035248
PCT Pub. Date: Mar. 27, 2008

(65) Prior Publication Data
US 2009/0237194 A1 Sep. 24, 2009

(30) Foreign Application Priority Data
Sep. 18, 2006 (EP) .................................... 06120840

(51) Int. Cl.
*H01J 7/00* (2006.01)
*H01F 38/14* (2006.01)
(Continued)

(52) U.S. Cl.
CPC .......... *H01F 38/14* (2013.01); *H01F 27/2804* (2013.01); *H02J 7/0027* (2013.01); *H02J 7/025* (2013.01)

(58) Field of Classification Search
CPC ....... H01F 27/2804; H01F 38/14; H02J 7/025; H02J 7/0027
(Continued)

(56) References Cited

U.S. PATENT DOCUMENTS 4,844,624 A * 7/1989 Teramachi ...................... 384/45
5,279,292 A 1/1994 Baumann et al.
(Continued)

FOREIGN PATENT DOCUMENTS

EP 0817351 A2 1/1998
JP 6105408 A 4/1994
(Continued)

*Primary Examiner* — Arleen M Vazquez
*Assistant Examiner* — David M. Schindler

(57) ABSTRACT

The apparatus 10 for electromagnetic energy transfer comprises a charging fixture 1 with a contact surface 4 and a generator coil 2 forming a resonator circuit with a capacitance. The charging fixture 1 is preferably arranged as an elongated bar whereon a plurality of chargeable electronic devices 5 can be arranged. In order to implement electromagnetic energy transfer from the charging fixture 1 to the electronic device 5 the latter has to be arranged with a pick-up circuit for generating secondary alternating current in a loop, preferably a secondary resonator circuit. In order to fix a position of the electronic device 5 on the charging bar 1, the charging bar is preferably arranged with a projection 3 extending in a plane of the contact surface 4. The electronic device 5 can be shaped to be hanged on the projection and removed from it in accordance with arrow 6.

8 Claims, 4 Drawing Sheets

(51) Int. Cl.
*H01F 27/28* (2006.01)
*H02J 7/00* (2006.01)
*H02J 7/02* (2016.01)

(58) Field of Classification Search
USPC .......................................................... 320/108
See application file for complete search history.

(56) References Cited

U.S. PATENT DOCUMENTS

| | | |
|---|---|---|
| 7,408,324 B2 | 8/2008 | Baarman et al. |
| 7,521,890 B2* | 4/2009 | Lee et al. ....................... 320/108 |
| 7,576,514 B2* | 8/2009 | Hui ............................... 320/108 |
| 7,683,572 B2* | 3/2010 | Toya .............................. 320/108 |
| 7,888,908 B2* | 2/2011 | Kuo ............................... 320/108 |
| 2005/0116683 A1* | 6/2005 | Cheng et al. .................. 320/108 |
| 2005/0189910 A1 | 9/2005 | Hui |
| 2006/0061325 A1* | 3/2006 | Tang et al. ..................... 320/108 |
| 2006/0108977 A1* | 5/2006 | Kagermeier et al. .......... 320/108 |
| 2007/0182367 A1* | 8/2007 | Partovi .......................... 320/108 |
| 2010/0177476 A1* | 7/2010 | Hotelling et al. ....... 361/679.41 |

FOREIGN PATENT DOCUMENTS

| | | | |
|---|---|---|---|
| JP | 8019189 A | 1/1996 |
| JP | 11098706 A | 4/1999 |
| JP | 2001309579 A | 11/2001 |
| JP | 2006-136192 A | 5/2006 |
| JP | 2006149168 A | 6/2006 |
| WO | 2005106901 A2 | 11/2005 |
| WO | 2005122686 A2 | 12/2005 |

\* cited by examiner

APPARATUS, A SYSTEM AND A METHOD FOR ENABLING ELECTROMAGNETIC ENERGY TRANSFER

FIELD OF THE INVENTION

The invention relates to an apparatus with a charging fixture with a contact surface for electromagnetic energy transfer via the contact surface to a plurality of electronic devices arranged with respective pick up circuits for receiving the electromagnetic energy when said electronic devices are positioned on the contact surface, said apparatus comprising a primary winding arranged substantially complementary to the contact surface.

The invention further relates to a system for electromagnetic energy transfer comprising the apparatus as is set forth in the foregoing.

The invention still further relates to a method for enabling electromagnetic energy transfer.

An apparatus as is set forth in the opening paragraph is known from U.S. 2005/0189910 A1. The known apparatus relates to a battery charger system comprising a charging module with a primary charging circuit, which is arranged substantially parallel to a planar contact surface of the known apparatus. The primary circuit includes a primary winding of a transformer. The known device is arranged to inductively charge an electronic device provided with a secondary circuit, which is conceived to act as a secondary winding of the transformer, when the electronic device is positioned on the contact surface of the known apparatus. The known apparatus comprises further a source of high frequency electric current which feeds this current to the primary winding. The primary transformer circuit in use transmits electromagnetic energy at high frequency through the contact surface that contains the primary transformer winding. The secondary transformer winding formed by the pick up circuit of the electronic device couples this energy and generates a secondary high frequency alternating voltage, which is then rectified by a suitable rectifier and is fed into a battery of the electronic device for charging purposes. In this way no electrical contact between the primary charger circuit and the electronic device is required.

It is a disadvantage of the known apparatus that specific means have to be taken to ensure a constant flux through the primary winding of the transformer, as for a planar spiral winding a magnetic flux distribution is not uniform along the cross-section of the primary winding. This makes the known apparatus more expensive and requires elaborate electronic circuitry for compensation of non-uniformity of the magnetic flux.

DESCRIPTION OF THE INVENTION

It is an object of the invention to provide an apparatus for electromagnetic energy transfer, which is simple, not expensive and reliable in operation.

To this end in the apparatus according to the invention the primary winding is arranged as a part of a resonator circuit conceived to enable electromagnetic energy transfer to respective pick-up circuits.

The technical measure of the invention is based on the insight that by arranging the primary circuit as a part of the resonator circuit, comprising capacitive and inductive elements, the architecture of the electronics is substantially simplified. As an advantage, the resonant circuit provides voltage and current shapes close to a sinusoidal shape even for a pulsed AC power supply, as can conveniently be generated by a switched mode power supply. Also problems with non-uniformities in the magnetic flux are overcome.

The apparatus according to the invention is suitable for charging rechargeable batteries of a great variety of electronic devices, notably mobile electronic devices, including mobile phones, domestic equipment, medical devices, health monitoring devices, personal care units, etc. Alternatively, or additionally, the electrical device may be arranged without any energy storage unit, so that it is operable only when positioned on the charging fixture. For, example such electronic device may be a lamp, or any other suitable equipment. In particular, the apparatus according to the invention is suitable for recharging smart wireless medical sensors for patient monitoring in intensive care units, which should be hermetically sealed. Such devices need batteries, which must be re-charged. In a medical care environment, a conventional solution with electrical contacts is subjected to pollution. Thus, a electromagnetic charging method is preferred. Existing solutions require a defined fixture to achieve a well defined magnetic circuit, implemented, for example in a per se known toothbrush. But such a fixture is still uncomfortable to handle. Furthermore, in a medical environment, several similar devices must be handled. Thus, a wireless inductive solution is needed, which does not require a precise positioning of the device and is capable of handling a number of devices. In the apparatus according to the invention, the electronic devices are placed on a contact surface, notably on a charging fixture. Preferably, the charging fixture is implemented as an elongated member having dimension of the contact surface substantially greater that the other dimensions. In preferred embodiment the charging fixture is implemented as a bar. In this embodiment a substantial improvement of ease of use is reached, as the user can simply position the electronic devise ultimately anywhere on the bar, still reaching the desired technical effect. Therefore, the apparatus according to the invention provides an easy and reliable charging for the mobile electronic devices, especially when hermetic sealing of such devices is required without any electrical contacts for the power supply.

In an embodiment of the apparatus the primary winding comprises a sole elongated coil arranged to generate an alternating magnetic field substantially within the whole contact surface.

Preferably, the charging fixture, notably the bar, contains a long generator coil that generates an alternating magnetic field, which is uniform along the length of the bar. Each mobile electronic device contains a receiver coil, in which the alternating magnetic field generates a voltage used to charge the battery. Thus, any electronic device may be charged on any arbitrary position on the charging fixture.

In a further embodiment of the invention the primary winding comprises a plurality of coil elements arranged to generate a net alternating magnetic field substantially within the whole contact surface.

In a second solution, the charging fixture, notably the bar, contains a number of generator coils, which are capable of generating an alternative magnetic field. Preferably, coil elements are arranged in an overlapping fashion, an area of each coil element being further arranged with a sensor for detecting a presence of the electronic device in the area of the coil element for selectively activating the coil element on demand. In this arrangement the coil elements are activated only when an electronic device is positioned above its area, thereby reducing the power consumption of the primary winding of the apparatus. Alternatively, it is possible to provide discrete positions for the electronic devices on the charging bar thereby still better controlling magnetic coupling between the charging fixture and the electronic device receiving electromagnetic energy. Furthermore, in this embodiment less redundant coils are necessary. It is noted that in this embodiment coils within the charging fixture do not need to overlap. The transmitter coils may be connected in parallel or in series or in a suitable combination to a mutual generator.

In a still further embodiment of the apparatus according to the invention the charging fixture is arranged to substantially exceed a complementary dimension of the electronic device and further comprises means for positioning the electronic device on the contact surface, the said means for positioning being arranged to fix a dwell position of the electronic device on the contact surface.

Preferably, means for positioning are arranged to mechanically fix a dwell position of the electronic device on the contact surface of the apparatus. Preferably, means for positioning comprises projections in a plane of the contact surface conceived to accommodate the electronic device. A suitable embodiment of this feature is a hook-like projection whereon the electronic device can be hanged on. In this way the weight of the electronic device adds to the improvement of the contact between the charging surface and the electronic device. Also, a better magnetic coupling is achieved because the freedom in positioning the electronic device in longitudinal direction is compensated by the positioning means defining the dwell position of the electronic device in the orthogonal direction. Alternatively or additionally, means for positioning comprises a snapping mechanism. Still alternatively or additionally, the means for positioning comprises a permanent magnet arranged to interact with the electronic device thereby attracting it with magnetic force to the contact surface. Still alternatively, the means for positioning may comprise releasable pins arranged on the contact surface of the charging fixture so that a mechanical switch is operated by putting the electronic device to the contact fixture and by pressing the pin thereby activating a corresponding coil.

A system for electromagnetic energy transfer comprising an apparatus as is set forth with reference to the foregoing and an electronic device arranged with a pick up circuit for receiving the electromagnetic energy. The system according to the invention is further discussed with reference to FIG. 4.

A method for enabling electromagnetic energy transfer comprising the steps of:
  providing an apparatus with a charging fixture with a contact surface enabling electromagnetic energy transfer via the contact surface to a plurality of electronic devices, said apparatus comprising a primary winding arranged substantially complementary to the contact surface, wherein the primary winding is arranged as a part of a resonator circuit conceived to inductively transfer energy;
  positioning at least one electronic device on the contact surface, said electronic device being arranged with a pick up circuit for receiving the electromagnetic energy;
  activating the resonator circuit thereby enabling the electromagnetic energy transfer to the electronic device.

These and other aspects of the invention will be apparent from and elucidated with reference to embodiments described hereinafter.

DESCRIPTION OF THE DRAWINGS

FIG. 1 presents a schematic view of a first embodiment of the apparatus according to the invention. The apparatus 10 comprises a charging fixture 1 with a contact surface 4. Preferably the contact surface 4 is arranged in a planar configuration. Complementary to a plane of the contact surface 4 a generator coil 2 forming the primary winding is arranged. The generator coil 2 is arranged to form a part of a resonator circuit with a capacitance (not shown) so that in use an oscillating magnetic field with a substantially homogenous flux across a cross-section of the coil 2 is formed. Operation of the apparatus 10 will be discussed with reference to FIG. 3. The charging fixture 1 is preferably arranged as an elongated bar in the direction, schematically given by L whereon a plurality of chargeable electronic devices 5 can be arranged. It is an advantage of this embodiment that the electronic device 5 can be effectively charged irrespective of its location on the bar 1, because the dimension of the bar L is substantially greater than the complementary dimension R of the electronic device. Preferably, the electronic device 5 comprises an on button 7a and an off button 7b and an indicator 8 of a full charge of the device's battery (not shown). In order to implement such electromagnetic energy transfer from the charging fixture 1 to the electronic device 5 the latter has to be arranged with a pick-up circuit (not shown) for generating secondary alternating current in a loop in accordance with Faraday law. In order to fix a position of the electronic device 5 on the charging bar 1, the charging bar is preferably arranged with a projection 3 extending in a plane of the contact surface 4. The electronic device 5 can be shaped to be hanged on the projection and removed from it in accordance with arrow 6.

FIG. 2 presents a schematic view of a second embodiment of the apparatus according to the invention. The apparatus 20 comprises a charging fixture 21 with a contact surface 27. Preferably the contact surface 27 is arranged in a planar configuration. Complementary to a plane of the contact surface 27 a plurality of overlapping generator coils 22 forming the primary winding is arranged. The generator coils 22 are arranged each to form a part of a resonator circuit with a capacitance (not shown) or a set of capacitances (not shown) so that in use an oscillating magnetic field with a substantially homogenous flux across a cross-section of the coils 22 is formed. Tracks 25 schematically shown by dashed lines represent inductor tracks of the partly overlapped inductors. Operation of this embodiment of the apparatus is similar to that discussed with reference to FIG. 3. The charging fixture 21 is preferably arranged as an elongated bar whereon a plurality of chargeable electronic devices 28 can be arranged. It is an advantage of this embodiment that the electronic device 28 can be effectively charged irrespective of its location on the bar 21. Still preferably, the charging bar 21 comprises a set of sensors 24, arranged to activate only coils in whose area the electronic device 28 is positioned. The sensors 24 are preferably pressure or illumination sensors. Still preferably, the sensors are arranged to detect an electromagnetic feedback of the electronic device 28. Suitable examples of such sensors comprise ferrite sensors and RF-ID sensors. In order to implement electromagnetic energy transfer from the charging fixture 21 to the electronic device 28 the latter has to be arranged with a pick-up circuit (not shown) for generating secondary alternating current in a loop in accordance with Faraday law. In order to fix a position of the electronic device 28 on the charging bar 21, the charging bar is preferably arranged with a projection 23 extending in a plane of the contact surface 27. The electronic device 28 can be shaped to be hanged on the projection and removed from it in accordance with arrow 26.

FIG. 3 presents a schematic view of an electric circuit diagram 30 for a single generator coil system, which can be used to generate the alternating current through the generator coil 35. It comprises two switches 33a and 33b switching in turn to feed the input voltage 31 to the coil 35 thereby generating a rectangular alternating voltage at the output. The operation of the switches 33a, 33b is controlled by a controller 32 thereby controlling the operational frequency. The series capacitor 34 forms a resonant circuit together with the inductivity of the generator coil 35. The capacitor 34 is selected such that the resonance frequency of this resonant circuit matches the operating frequency. This way, the alternating current is sinusoidal and has a low content of higher harmonics, which could disturb other electronic equipment. The resonant circuits in the transmitter and/or receiver may comprise a capacitance in parallel to the inductor winding. It may be used in addition to the series capacitor 34. In the transmitter it may compensate the inductor current such that the driver sees less inductive current and has thus less losses. It may also be used instead of the series capacitor 34. Especially in the electronic device a parallel capacitor is advantageous for loads with higher resistivity, because in this case the impedance is matched better and the electronic device requires less turns for a higher output voltage.

Preferably, the generator coil 35 is made from printed circuit board (PCB) tracks. The generator circuit can advantageously be located on the same PCB. It is advantageous to place a softmagnetic plate behind the generator coils. This shields the magnetic fields from equipment and persons behind the fixture and improves the magnetic coupling to the receiver device. The thus formed apparatus for electromagnetic energy transfer comprises a contact surface 36, whereby the winding of the generator coil 35 is arranged complementary to a plane of the contact surface 36. The apparatus can be used to charge a plurality of electronic devices. In this particular embodiment only two such devices are shown (A, B). Each device is arranged with a pick-up circuit comprising a secondary coil 37, respectively 38 and a load A, respectively B. The load can be any electronic device or a rechargeable battery. The circuit diagram of a typical electronic device enabling such wireless charging is schematically presented in FIG. 4.

Figure 1:
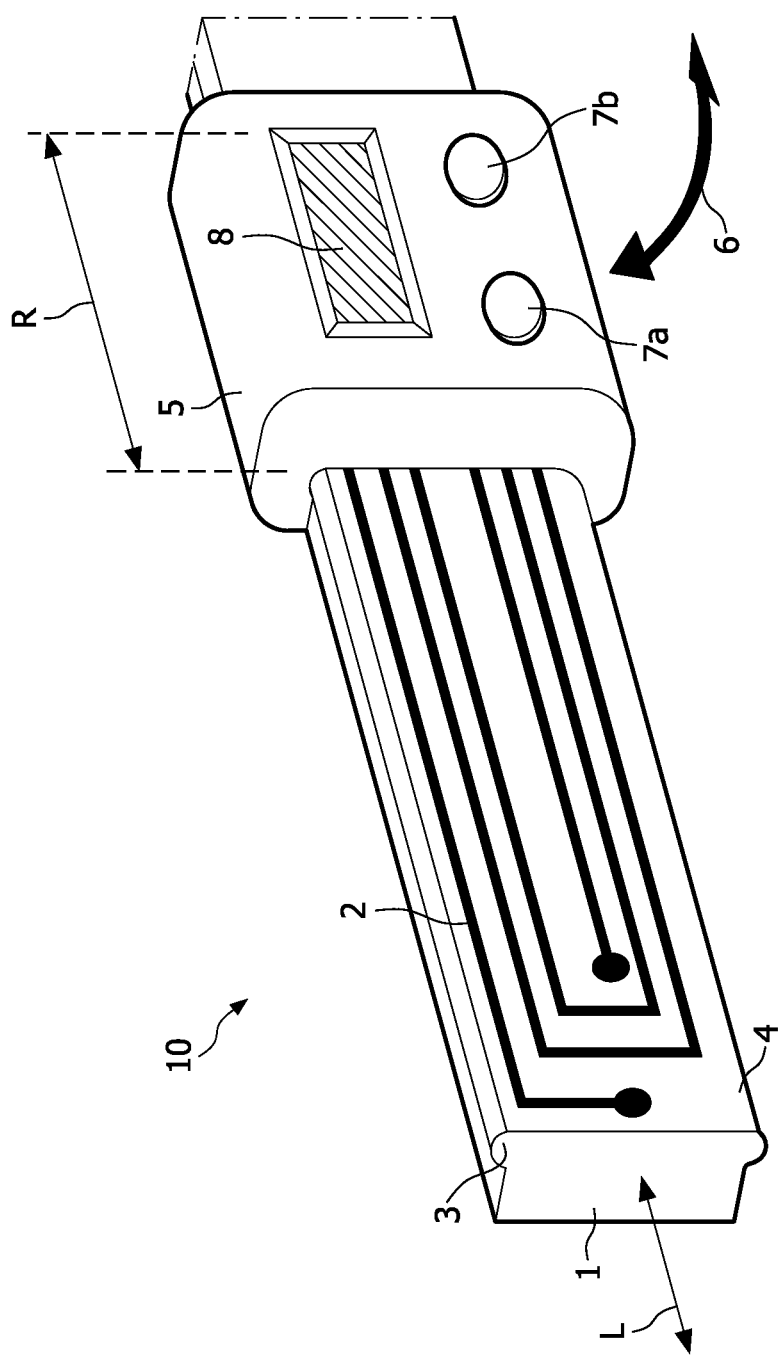
FIG. 1 presents a schematic view of a first embodiment of the apparatus according to the invention.
Figure 2:
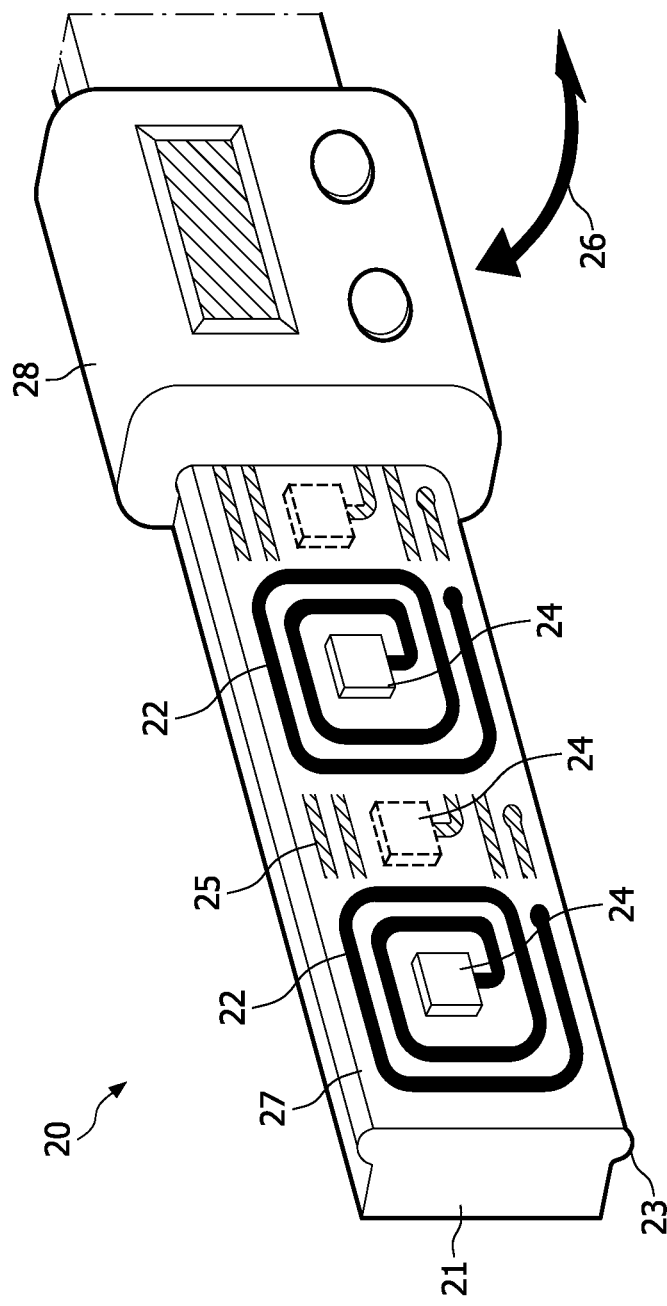
FIG. 2 presents a schematic view of a second embodiment of the apparatus according to the invention.
Figure 3:
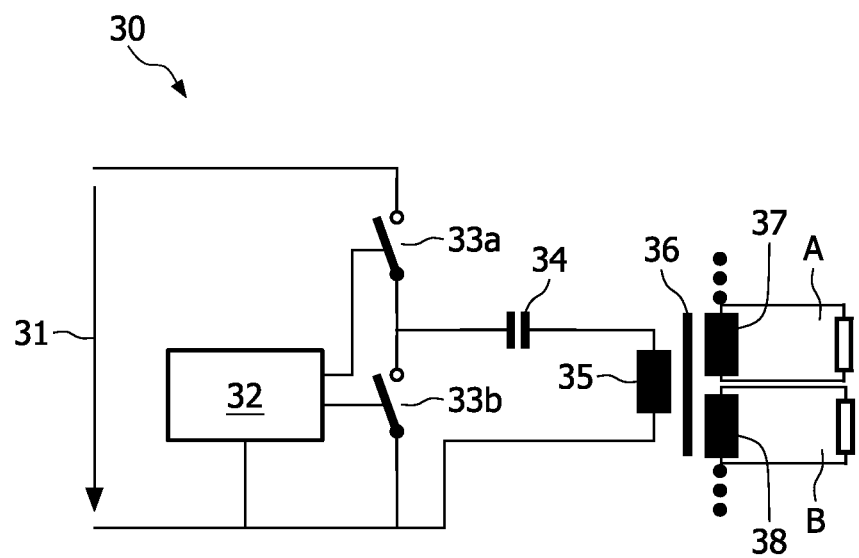
FIG. 3 presents a schematic view of an electric circuit diagram for a single generator coil system.
Figure 4:
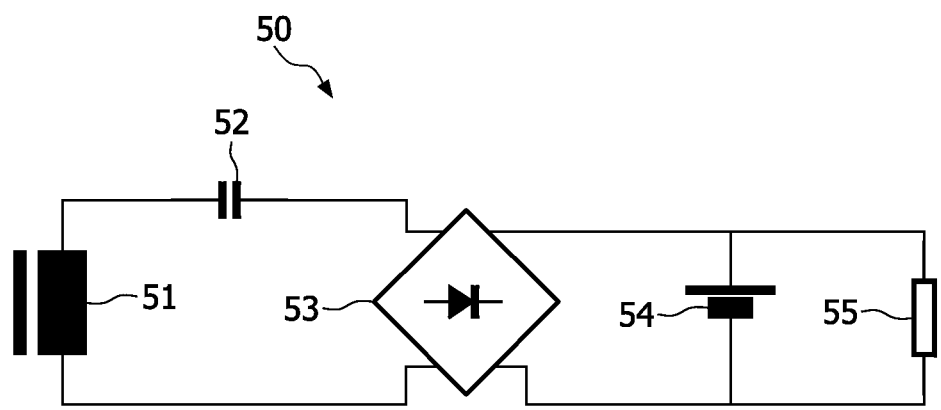
FIG. 4 presents a schematic view of an embodiment of a circuit diagram of the electronic device in the system according to the invention.

In FIG. 4 a secondary coil 51 and a capacitance 52 form a secondary resonating circuit, which produces an alternating voltage which is subjected to influence of alternating magnetic field. The alternating voltage is rectified by a rectifier 53 to form a direct current, which is then supplied to a rechargeable battery 54. The load resistor 55 represents electronic circuit of the electronic device.

Figure 5:
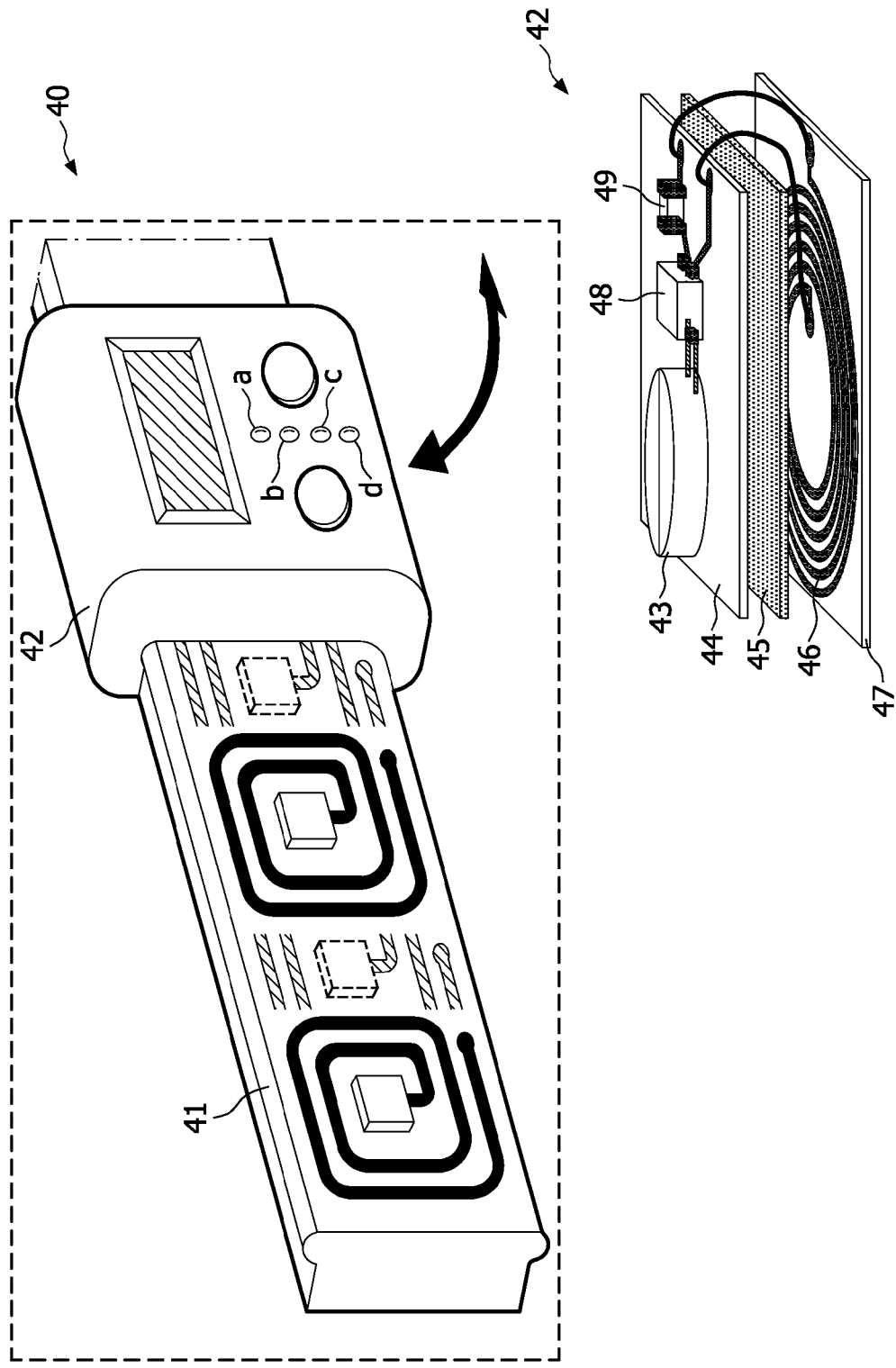
FIG. 5 presents a schematic view of an embodiment of the system according to the invention.

FIG. 5 presents a schematic view of an embodiment of the system according to the invention. The system 40 comprises an apparatus 41 for electromagnetic energy transfer according to the invention and an electronic device 42. An elevated view of the device is presented to ease comprehension of its architecture. The electronic device 42 comprises a printed circuit board 47 whereon a receiver winding 46 is arranged. The device 42 preferably comprises a softmagnetic plate 45 arranged to shield the magnetic fields from the interior of the device, comprising receiver circuit substrate 44, and to enhance the magnetic coupling. Still preferably, the electronic device 42 may be arranged on a planar circuit board 44. It is also advantageous to arrange the primary winding of the charging fixture on its own planar circuit board. A capacitor 49 may be connected in series to compensate the leakage inductivity of the arrangement. The alternating voltage is rectified to a DC-voltage by a rectifier 48 and is fed to a battery 43. Preferably, soft-magnetic layers of the generator and receiver coils are laminated to the printed circuit board in order to simplify the manufacturing process.

Preferably, the electronic device 42 comprises a plurality of indicators a, b, c, d arranged to indicate a status of electromagnetic energy transfer. Conveniently, the indicator "a" can be arranged to show to the user that power is available, indicator "b" can be arranged to show that charging is in progress, indicator "c" can be arranged to show that the charging is ended and indicator "d" can be arranged to show how far is charging process. Other functions which fall within the scope of technical knowledge of the person skilled in the art are contemplated as well. The indicators may alternatively be positioned on the charging fixture 41.

It is convenient to arrange the charging fixture 41 of the system 40 according to the invention on a portion of a vertical surface, notably a wall. For this purpose the charging fixture can be conveniently provided with mounting means (not shown), like hooks, pins, or the like. In a further embodiment of the system according to the invention the charging fixture 41 may be arranged as a part of an equipment, it being a piece of furniture, for example, an edge of a furniture piece, a part of a vertical table surface, or a suitable portion of medical equipment, like, for example, an X-ray unit.

While the invention has been illustrated and described in detail in the drawings and foregoing description, such illustration and description are to be considered illustrative or exemplary and not restrictive; the invention is not limited to the disclosed embodiments.

The invention claimed is:

1. An apparatus with a charging fixture for electromagnetic energy transfer to a plurality of electronic devices with pick up circuits for receiving the electromagnetic energy, the charging fixture comprising:

a contact surface configured to be contacted by a charge receiving surface of each of the electronic devices during electromagnetic energy transfer, a rear surface and a pair of opposite, parallel sides extending between the contact and rear surfaces, the electronic devices including an engaging mechanism which engages the sides of the charging fixture on opposite sides of the contact surface with the charge receiving surface in a plane parallel to the contact surface;

a plurality of circuits, each circuit including a primary winding and a sensor which senses a presence of a one of the plurality of electronic devices adjacent the primary winding of the respective circuit;

wherein the primary windings are positioned in a partially overlapping array along the contact surface, wherein in response to one of the sensors sensing the one of the electronic devices adjacent the primary winding of one of the plurality of circuits, the one of the sensors activates the primary windings of the one of the plurality of circuits, wherein the charging fixture and the contact surface are elongated substantially in one dimension, and the partially overlapping primary windings are arranged in a single row along the one dimension.

2. The apparatus according to claim 1, wherein the sides of the charging fixture include ribs extending oppositely in a direction parallel to the contact surface, the engaging mechanism of the electronic devices engaging the ribs.

3. The apparatus according to claim 2, wherein each sensor of the plurality of circuits is one of a pressure and illumination sensor.

4. The apparatus according to claim 2, wherein the sensor of each of the plurality of circuits that senses a presence of the one of the plurality of electronic devices adjacent the primary winding of the respective circuit further includes the sensor of the plurality of circuit is arranged to detect a soft magnetic core of a respective one of the electronic devices disposed adjacent the primary winding of one of the respective circuits.

5. The apparatus according to claim 2, wherein at least one of the electronic devices is electrically operable only when positioned in contact with the charging fixture.

6. The apparatus according to claim 2, further including: charging indicators.

7. The apparatus according to claim 2, wherein the primary windings of the charging fixture are arranged on a printed circuit board.

8. The apparatus according to claim 2, wherein the electronic devices include rechargeable medical devices wherein the charging fixture is integrated in medical equipment.

* * * * *